(12) United States Patent
Grossman et al.

(10) Patent No.: US 6,357,901 B1
(45) Date of Patent: Mar. 19, 2002

(54) SNAP-IN ROOF MARKER LAMP ASSEMBLY

(75) Inventors: Vitaly Grossman, West Bloomfield; David R. Skubik, Clarkston; Robert V Maynard, St. Clair Shores; Wayne E. Cassidy, White Lake, all of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/677,332

(22) Filed: Sep. 28, 2000

(51) Int. Cl.[7] .............................. B60Q 1/00; B60Q 1/26; B60Q 11/00
(52) U.S. Cl. ....................... 362/493; 362/549; 362/457; 362/368
(58) Field of Search ............................... 362/493, 496, 362/546, 549, 368, 457

(56) References Cited

U.S. PATENT DOCUMENTS 5,465,200 A * 11/1995 Finocchio ................... 362/368

* cited by examiner

*Primary Examiner*—Sandra O'Shea
*Assistant Examiner*—Ali Alavi
(74) *Attorney, Agent, or Firm*—Laura C. Hargitt

(57) ABSTRACT

A snap-in roof marker lamp assembly for a vehicle includes a roof marker lamp adapted to be disposed adjacent a roof of a vehicle. The snap-in roof marker lamp assembly also includes a plurality of fasteners extending through the roof marker lamp. The snap-in roof marker lamp assembly further includes a plurality of retainers disposed adjacent the roof marker lamp to receive the fasteners for preventing the fasteners from exiting the roof marker lamp and adapted to be snapped into apertures in the roof to secure the roof marker lamp to the roof.

16 Claims, 2 Drawing Sheets

SNAP-IN ROOF MARKER LAMP ASSEMBLY

TECHNICAL FIELD

The present invention relates generally to roof marker lamps for vehicles and, more particularly, to a snap-in roof marker lamp assembly for a vehicle.

BACKGROUND OF THE INVENTION

It is known to provide a roof marker lamp for a vehicle such as a sport utility vehicle or a pick-up truck. Typically, the roof marker lamp is attached to an outer surface of a roof of the vehicle. The roof marker lamp is typically attached to the roof by a plurality of individual screws extending through the roof marker lamp and engaging separate individual nuts, which are disposed in recesses in the roof. However, the separate screws and nuts do not typically allow the roof lamp marker to be installed or attached to the roof in a required time. In addition, the head of the screws cannot be adequately sealed around the roof lamp marker. Further, the screws and nuts do not provide sufficient linear clamping force to seal completely around the entire roof marker lamp.

As a result, it is desirable to provide a new roof marker lamp assembly for a vehicle. It is also desirable to provide a roof marker lamp assembly that snaps-in for installation to the roof of the vehicle. It is further desirable to provide a roof marker lamp assembly that seals the head of the fasteners and provides adequate sealing and clamping force when installed on the roof of the vehicle. Therefore, there is a need in the art to provide a snap-in roof marker lamp assembly for a vehicle.

SUMMARY OF THE INVENTION

It is, therefore, one object of the present invention to provide a new roof marker lamp assembly for a vehicle.

It is another object of the present invention to provide a snap-in roof marker lamp assembly for a vehicle.

To achieve the foregoing objects, the present invention is a snap-in roof marker lamp assembly for a vehicle. The snap-in roof marker lamp assembly includes a roof marker lamp adapted to be disposed adjacent a roof of a vehicle. The snap-in roof marker lamp assembly also includes a plurality of fasteners extending through the roof marker lamp. The snap-in roof marker lamp assembly further includes a plurality of retainers disposed adjacent the roof marker lamp to receive the fasteners for preventing the fasteners from exiting the roof marker lamp and adapted to be snapped into apertures in the roof to secure the roof marker lamp to the roof.

One advantage of the present invention is that a snap-in roof marker lamp assembly is provided for a vehicle. Another advantage of the present invention is that the snap-in roof marker lamp assembly has a one-piece design, snap-in style, but with metal fasteners, offering adequate sealing for a roof marker lamp to a vehicle. Yet another advantage of the present invention is that the snap-in roof marker lamp assembly allows the head of the fasteners such as screws to be sealed. Still another advantage of the present invention is that the snap-in roof marker lamp assembly generates sufficient linear clamping force to seal completely around the entire roof marker lamp. A further advantage of the present invention is that the snap-in roof marker lamp assembly reduces installation time and improves quality due to adequate sealing. Yet a further advantage of the present invention is that the snap-in roof marker lamp assembly reduces cost and separate or loose parts.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
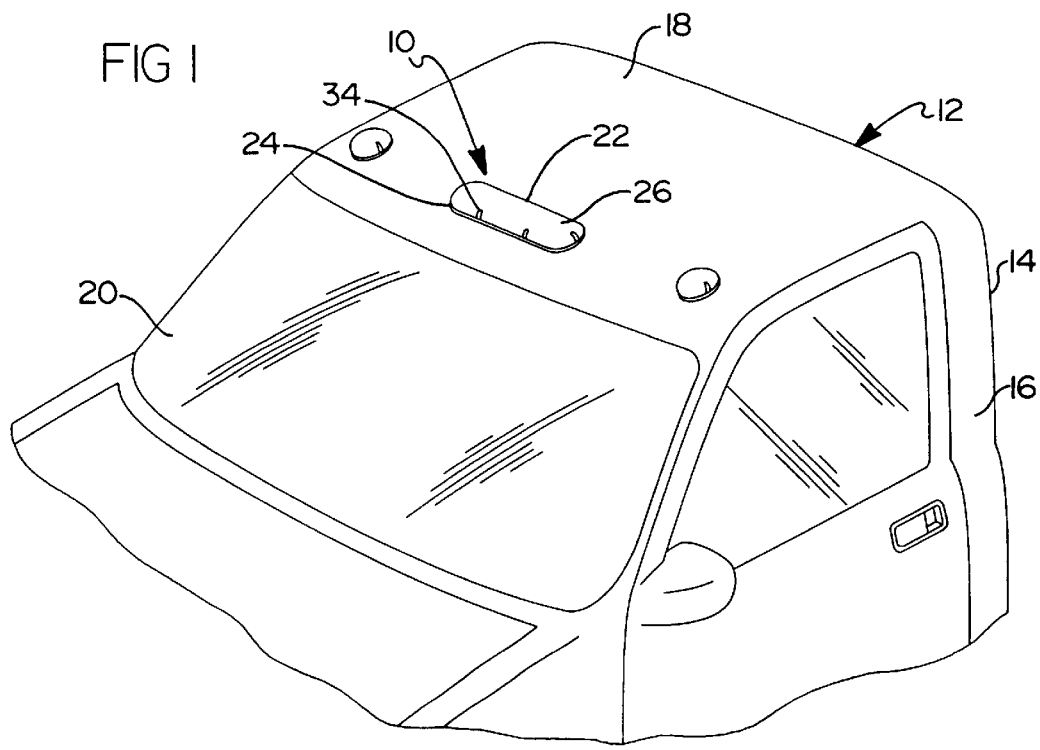
FIG. 1 is a perspective view of a snap-in roof marker lamp assembly, according to the present invention, illustrated in operational relationship with a vehicle.
Figure 3:
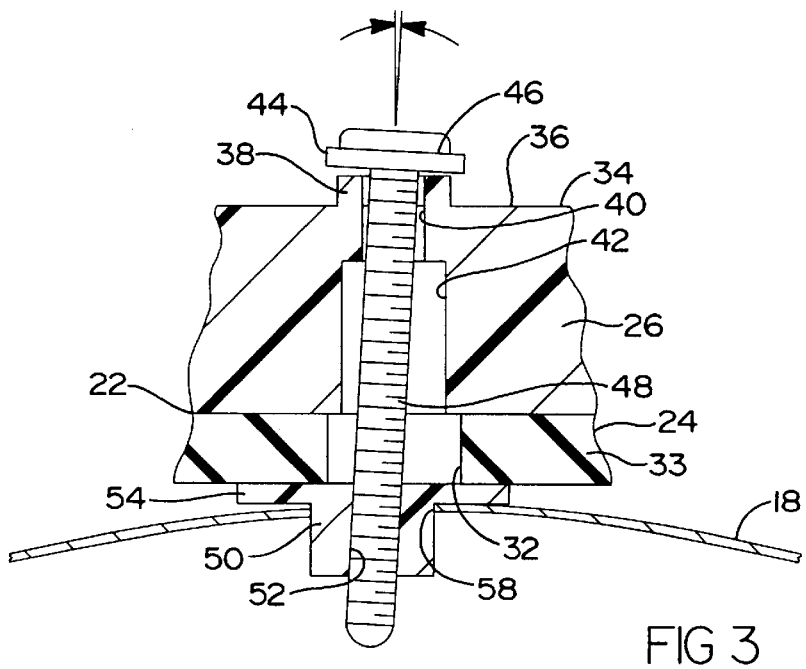
FIG. 3 is a fragmentary elevational view of the snap-in roof marker lamp assembly of FIG. 1.
Figure 2:
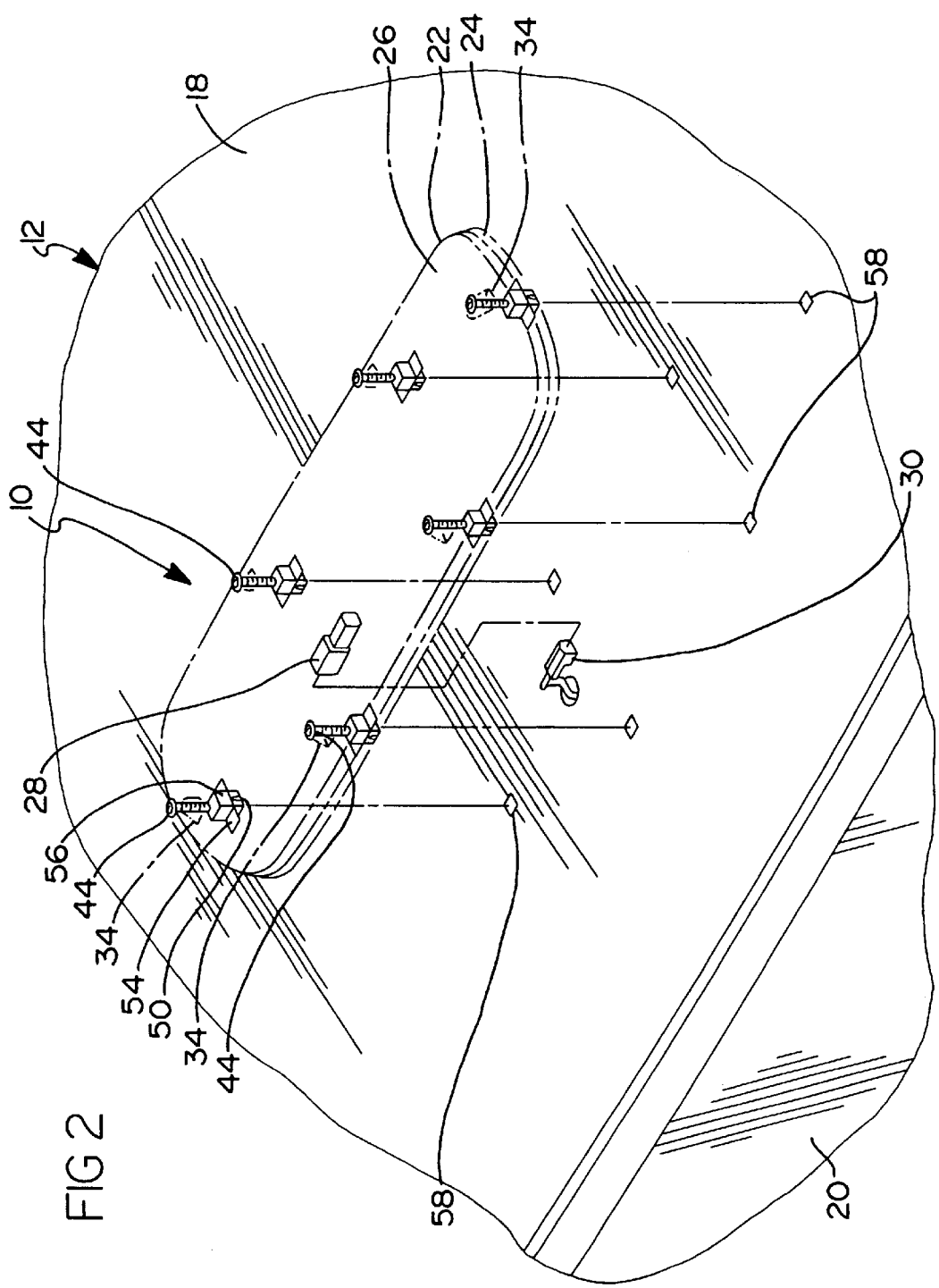
FIG. 2 is an exploded perspective view of the snap-in roof marker lamp assembly of FIG. 1.

Referring to the drawings and in particular FIGS. 1 through 3, one embodiment of a snap-in roof marker lamp assembly 10, according to the present invention, is shown for a vehicle such as a pick-up truck, generally indicated at 12. The vehicle 12 includes a vehicle body 14 forming sides 16 and a roof 18 and including a windshield 20 extending forwardly and downwardly at a front longitudinal end thereof. It should be appreciated that, except for the snap-in roof marker lamp assembly 10, the vehicle 12 is conventional and known in the art.

Referring to FIGS. 2 and 3, the snap-in roof marker lamp assembly 10 includes a roof marker lamp 22. The roof marker lamp 22 is generally rectangular in shape and has a base 24 and a lens 26 disposed over the base 24. The base 24 has a bottom surface with a contour that differs from that of the roof 18 so that before the roof marker lamp 22 is secured to the roof 18 only outboard edges of the roof marker lamp 22 touch the roof 18. The base 24 includes a connector 28 for a lamp or bulb (not shown), which is connected to a roof lamp harness connector 30 attached to the roof 18. The base 24 has a plurality of apertures 32 spaced along a periphery thereof for a function to be described. The base 24 is made of a rigid material such as a plastic material, preferably polycarbonate. The base 24 includes a seal 33 such as a rubber gasket extending around the periphery of the base 24 for engagement with the outer surface of the roof 18. I should be appreciated that the seal 33 is conventional and known in the art.

The lens 26 is generally rectangular in shape and has a generally arcuate or curved cross-sectional shape. The lens 26 is disposed over the base 24 and has a plurality of recesses 34 spaced along a periphery thereof and aligned with the apertures 32 of the base 24. Each of the recesses 34 has a bottom surface 36, which is generally planar and horizontal, and a rim 38 extending upwardly into the recess 34 and generally perpendicular to the bottom surface 36. The rim 38 is generally circular in shape. Each of the recesses 34 has an aperture 40 extending through the rim 38 to the base 24. The aperture 40 includes an enlarged cavity or portion 42 disposed below the rim 38 and adjacent the base 24. The rim 38 is approximately one millimeter (1.0 mm.) in height and approximately 0.5 mm. thick for a function to be described. The lens 26 is made of a rigid material such as a plastic material, preferably polycarbonate.

The snap-in roof marker lamp assembly 10 also includes a fastener 44 such as a screw extending through the roof marker lamp 22. The fastener 44 has a head 46 extending radially and a threaded shaft 48 extending axially from the head 46. The fastener 44 is disposed in the recess 34 such that the threaded shaft 48 extends through the aperture 40 in the lens 26 and the aperture 32 in the base 24 and the head 46 abuts the rim 38. The fasteners 44 are made of a metal material such as steel. It should be appreciated that the threaded shaft 48 is of a sufficient length to extend past the base 24 for a function to be described.

The snap-in roof marker lamp assembly 10 further includes a retainer 50 disposed adjacent the base 24 and engaging the threaded shaft 48 of the fastener 44 to retain the fastener 44 to the roof marker lamp 22 and the roof 18 of the vehicle 12. The retainer 50 has a threaded aperture 52 extending therethrough to receive the threaded shaft 48 of the fastener 44. The retainer 50 also has a flange 54 extending outwardly to abut the bottom surface of the base 24. The retainer 50 may include a projection or extension 56 extending upwardly from the flange 54 and through the aperture 32 in the base 24 to be disposed in the enlarged portion 42 of the aperture 40. The retainers 50 are of a push-nut type to be disposed in a plurality of, preferably six, apertures 58 extending through the roof 18 to secure the roof marker lamp 22 to the roof 18. The retainers 50 are made of a plastic material. It should be appreciated that the extension 56 orients the retainer 50 during assembly of the roof marker lamp 22 onto the roof 18 of the vehicle 12.

In operation of the snap-in roof marker lamp assembly 10, the lens 26 is disposed over the base 24 of the roof marker lamp 22. The fasteners 44 are disposed in the recesses 34 of the lens 26 with the threaded shafts 48 extending through the apertures 40 to engage the retainers 50 disposed in the apertures 32 and enlarged portions 42 of the apertures 40. The fasteners 44 are rotated such that the threaded shafts 48 threadably engage the threaded apertures 52 of the retainers 50. It should be appreciated that the snap-in roof marker lamp assembly 10 is pre-assembled before being installed on the vehicle 12.

Once the snap-in roof marker lamp assembly 10 is pre-assembled, the roof marker lamp 22 is disposed adjacent the roof 18 such that the retainers 50 are snapped into the apertures 58 and engage the roof 18. Before torquing the fasteners 44, only the outboard edges of the roof marker lamp 22 touch the roof 18. The fasteners 44 are completely torqued one at a time, with the sequence being irrelevant. The extensions 56 of the retainer 50 mate in the roof marker lamp 22, allowing enough movement to align all retainers 50 with their apertures 58 in the roof 18. As the fasteners 44 are torqued, the fasteners 44 mate with the rims 38 that are deformed during torquing to provide a leak-free seal. In addition, the retainers 50 expand and engage the roof 18 to secure the roof marker lamp 22 thereto. It should be appreciated that the rim 38 is crushable and that no openings are allowed around and under the head of the fasteners 44 to seal the head 46 of the fasteners 44. It should also be appreciated that the fasteners 44 may be removed to change the bulbs of the roof marker lamp 22 so that rims have to re-seal during the expected five to six torquings over the life of the vehicle 12.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A snap-in roof marker lamp assembly for a vehicle comprising:
    a roof marker lamp adapted to be disposed adjacent a roof of a vehicle;
    a plurality of fasteners extending through said roof marker lamp; and
    a plurality of retainers disposed adjacent said roof marker lamp to receive said fasteners for preventing said fasteners from exiting said roof marker lamp and adapted to be snapped into apertures in the roof to secure said roof marker lamp to the roof.

2. A snap-in roof marker lamp assembly as set forth in claim 1 wherein said roof marker lamp comprises a base and a lens disposed over said base.

3. A snap-in roof marker lamp assembly as set forth in claim 2 wherein said base includes a plurality of first apertures extending therethrough.

4. A snap-in roof marker lamp assembly as set forth in claim 3 wherein said lens has a plurality of second apertures extending therethrough and aligned with said first apertures.

5. A snap-in roof marker lamp assembly as set forth in claim 4 wherein said lens includes a plurality of recesses having a bottom surface, one of said second apertures extending through said bottom surface.

6. A snap-in roof marker lamp assembly as set forth in claim 5 wherein each of said recesses has a rim extending upwardly from said bottom surface one of said second apertures extending through said rim.

7. A snap-in roof marker lamp assembly as set forth in claim 6 wherein said rim is crushable.

8. A snap-in roof marker lamp assembly as set forth in claim 4 wherein each of said second apertures has an enlarged portion.

9. A snap-in roof marker lamp assembly as set forth in claim 8 wherein each of said retainers include an extension to extend through one of said first apertures and into said enlarged portion of one of said second apertures.

10. A snap-in roof marker lamp assembly as set forth in claim 8 wherein each of said retainers has a flange extending outwardly to abut said base.

11. A snap-in roof marker lamp assembly comprising:
    a roof of a vehicle having a plurality of first apertures extending therethrough;
    a roof marker lamp disposed adjacent said roof including a base and a lens disposed over said base, wherein said base includes a plurality of second apertures extending therethrough and said lens includes a plurality of third apertures extending therethrough and aligned with said second apertures and a plurality of recesses having a bottom surface, one of said third apertures extending through said bottom surface;
    a plurality of fasteners extending through said roof marker lamp; and
    a plurality of retainers disposed adjacent said roof marker lamp to receive said fasteners for preventing said fasteners from exiting said roof marker lamp and snapped into said first apertures in said roof to secure said roof marker lamp to said roof.

12. A snap-in roof marker lamp assembly as set forth in claim 11 wherein each of said recesses has a rim extending upwardly from said bottom surface, one of said third apertures extending through said rim.

13. A snap-in roof marker lamp assembly as set forth in claim 12 wherein said rim is crushable.

14. A snap-in roof marker lamp assembly as set forth in claim 11 wherein each of said third apertures has an enlarged portion.

15. A snap-in roof marker lamp assembly as set forth in claim 14 wherein each of said retainers include an extension to extend through one of said second apertures and into said enlarged portion of one of said third apertures.

16. A roof assembly for a vehicle comprising:
- a roof having a plurality of first apertures extending therethrough;
- a roof marker lamp comprising a base disposed adjacent said roof and a lens disposed over said base;
- said base having a plurality of second apertures extending therethrough;
- said lens includes a plurality of recesses having a bottom surface and a plurality of third apertures, one of said third apertures extending through said bottom surface;
- a plurality of fasteners extending through said second apertures and said third apertures; and
- a plurality of retainers disposed adjacent said roof marker lamp to receive said fasteners for preventing said fasteners from exiting said roof marker lamp and snapped into said first apertures in said roof to secure said roof marker lamp to said roof.

* * * * *